United States Patent
Wang

(10) Patent No.: US 8,224,367 B2
(45) Date of Patent: Jul. 17, 2012

(54) METHOD AND SYSTEM FOR ESTIMATING STATION NUMBERS IN WIRELESS COMMUNICATIONS

(75) Inventor: Chun-Yen Wang, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 442 days.

(21) Appl. No.: 12/466,512

(22) Filed: May 15, 2009

(65) Prior Publication Data

US 2009/0291703 A1 Nov. 26, 2009

Related U.S. Application Data

(60) Provisional application No. 61/055,644, filed on May 23, 2008.

(51) Int. Cl.
*H04B 7/00* (2006.01)
(52) U.S. Cl. ............... 455/518; 455/67.11; 455/519
(58) Field of Classification Search .............. None
See application file for complete search history.

(56) References Cited

U.S. PATENT DOCUMENTS

| | | | |
|---|---|---|---|
| 6,987,749 B2 | 1/2006 | Cai et al. | |
| 2004/0157640 A1 | 8/2004 | Pirskanen et al. | |
| 2004/0196803 A1 | 10/2004 | Yi et al. | |
| 2008/0043658 A1* | 2/2008 | Worrall | 370/312 |
| 2010/0329167 A1* | 12/2010 | Linden et al. | 370/312 |

* cited by examiner

*Primary Examiner* — Anh Tran
(74) *Attorney, Agent, or Firm* — Finnegan, Henderson, Farabow, Garrett & Dunner, LLP

(57) ABSTRACT

Consistent with the disclosed embodiments, a method for evaluating the number of mobile stations in a target group uses a processor to execute instructions to perform the method. The method may initiate a counting event using the processor. In response to the counting event, a counting request message may be transmitted over a first communication channel. The counting request message may comprise a code set. The code set may comprise a plurality of orthogonal codes. In response to the counting request message transmitted, receipt of a first counting response message over a second communication channel may be confirmed. The counting response message may comprise a first code. The first code, consistent with some embodiments, may comprise content corresponding to a portion of the code set. Based in part on confirmation of receipt of the counting response message, the number of mobile stations in the target group may be determined independent of a connection status of each mobile station.

26 Claims, 6 Drawing Sheets

METHOD AND SYSTEM FOR ESTIMATING STATION NUMBERS IN WIRELESS COMMUNICATIONS

CROSS REFERENCES TO RELATED APPLICATIONS

This application claims the benefit of priority from U.S. Provisional Application No. 61/055,644, filed May 23, 2008, the entire contents of which is incorporated herein by reference.

TECHNICAL FIELD

Embodiments disclosed herein relate to wireless communications and, more particularly, to methods and systems for estimating the number of mobile stations in a target group.

BACKGROUND

In wireless communications, the number of stations, such as mobile stations used by individual users, may be information that may be used for communication management or other communication controls. One example may include selecting appropriate service parameters or transmission modes based in part on the number of mobile stations.

Specifically, Multimedia Broadcast/Multicast Service (MBMS), also known as broadcast multicast service (MBS), is an IP datacast service that utilizes several types of transmission modes to deliver data services to many mobile stations simultaneously. Transmission modes may include, for example, point-to-point (PTP), single-cell point-to-multipoint (SC-PTM), and multi-cell point-to-multipoint (MC-PTM).

In some cases, the determination of which transmission mode may be the most appropriate to deliver a particular MBMS service across a service area may be made based on the number of mobile stations receiving the MBMS within the service area. For example, a mobile station in an active mode may be configured to receive a particular MBMS service. The number active mobile stations may be detected by computing equipment coupled to a base station. In response to detecting the number of mobile stations, the base station may then establish multiple PTP channels or a point-to-multipoint (PTM) channel. For example, a PTM channel may be used to service a large number of mobile stations, while multiple PTP channels may be a more efficient transmission mode to deliver the same data content to a smaller number of active mobile stations within a service area. Thus, a determination or better estimate of the number of mobile stations receiving a particular MBMS service may help better utilizing limited radio and network resources associated with the base station.

Common methods used to determine the number of mobile stations receiving a particular MBMS are often limited, depending on the applications and the required level of accuracy. For example, some methods do not include mobile stations within a service area operating in an idle mode. Mobile stations operating in an idle mode, however, could be detected by forcing them into an active state. Yet, such approach may cause inefficient use of the network resources in some applications, because the approach utilizes revenue-generating bandwidth solely to perform a counting process. Therefore, it may be desirable for some applications to detect mobile stations independent of a current connection state.

BRIEF SUMMARY

Consistent with the disclosed embodiments, a method for evaluating the number of mobile stations in a target group uses a processor to execute instructions to perform the method. In some embodiments, the method initiates a counting event using the processor. In response to the counting event, a counting request message may be transmitted over a first communication channel. In some embodiments, the counting request message may comprise a code set. The code set, in some embodiments, may comprise a plurality of orthogonal codes. In response to the counting request message transmitted, receipt of a first counting response message over a second communication channel may be confirmed. In some embodiments, the counting response message may comprise a first code. The first code, consistent with some embodiments, may comprise content corresponding to a portion of the code set. Based in part on confirmation of receipt of the counting response message, the number of mobile stations in the target group may be determined independent of a connection status of each mobile station.

Further in accordance with the disclosed embodiments, another method for evaluating the number of mobile stations in a target group uses a processor to execute instructions to perform the method. In some embodiments, the method may assign a plurality of codes to the target group using the processor. In response to the plurality of codes, the receipt of a first code over a first communication channel may be confirmed during a first trial. In response to the confirmation, a current iteration value may be compared to a threshold value. In some embodiments, when the current iteration value is less than the threshold value, the current iteration value may be incremented to perform a second trial. In response to the plurality of codes during the receipt of a second code over a second communication channel may be confirmed during a second trial. Using the processor that performs a station number estimation based in part on confirming receipt of the first and the second code, a determination of the number of mobile stations in the target group may be made when the current iteration value is greater than or equal to the threshold value or a counting stop message sent. In some embodiments, the determination of the number of mobile stations in the target group may be based on a maximum number of codes received during each trial. In other embodiment, the determination of the number of mobile stations in the target group may be based on a maximum likelihood estimation.

Further in accordance with the disclosed embodiments, still another method for evaluating the number of mobile stations in a target group uses a processor to execute instructions to perform the method. In some embodiments, the method may initiate a counting event using the processor. In response to the counting event, a counting request message comprising a code set and a probability factor may be transmitted over a first communication channel. In response to a plurality of codes based in part on the probability factor, receipt of a first code over a second communication channel may be confirmed during a first trial. In response to the confirmation, a current iteration value may be compared to a threshold value. When the current iteration value is less than the threshold value, the current iteration value may incremented to perform a second trial. In response to the plurality of codes during the second trial based in part on the probability factor, receipt of a second code over a third communication channel may be confirmed. Using the processor that performs a station number estimation based in part on confirming receipt of the first and the second code, the number of mobile stations in the target group may be determined when the current iteration value is greater than or equal to the threshold value or a counting stop message is sent.

Further in accordance with the disclosed embodiments, there is a method of responding to a counting request message. In some embodiments, the counting request message may be received by a receiver over a communication channel. In response to the counting request message, at least one code may be selected. The at least one code may be transmitted using a transmitter over an uplink resource. In some embodiments, selecting the at least one code in response to the counting request message further comprises selecting a code in response to a predefined code set or an assigned code set included in the counting request message. In some embodiments, transmitting over the uplink resource the at least one code comprises transmitting the at least one code over a pre-defined uplink resource or an assigned uplink resource included in the counting request message.

Further in accordance with the disclosed embodiments, a base station serving a target group may comprise: a transmitter configured to send a counting request message over a first communication channel; a receiver configured to receive from a second communication channel a first code, associated with the counting request message, in response to transmitting the counting request message; and a processor configured to confirm receipt of the first code and evaluate, based in part on the confirmation, a number of mobile stations in the target group independent of a connection status of each mobile station.

Additional descriptions of the disclosed embodiments will be set forth in part in the description which follows, and in part will be obvious from the description, or may be learned by practice of the invention.

It is to be understood that both the foregoing general description and the following detailed description are exemplary and explanatory only and are not restrictive of the disclosed embodiments, as claimed.

BRIEF DESCRIPTION OF THE DRAWINGS

The foregoing summary, as well as the following detailed description of the disclosed embodiments, will be better understood when read in conjunction with the appended drawings. For the purpose of illustrating the disclosed embodiments, there are shown in the drawings that are presently preferred. It should be understood however, that the invention is not limited to the precise arrangement and instrumentalities shown.

In the drawings.

DETAILED DESCRIPTION OF THE DISCLOSED EMBODIMENTS

Reference will now be made in detail to disclosed embodiments illustrated in the accompanying drawings. Wherever possible, the same reference numbers will be used throughout the drawings to refer to the same or like portions. It should be noted that the drawings are in greatly simplified form and are not to precise scale.

Figure 1:
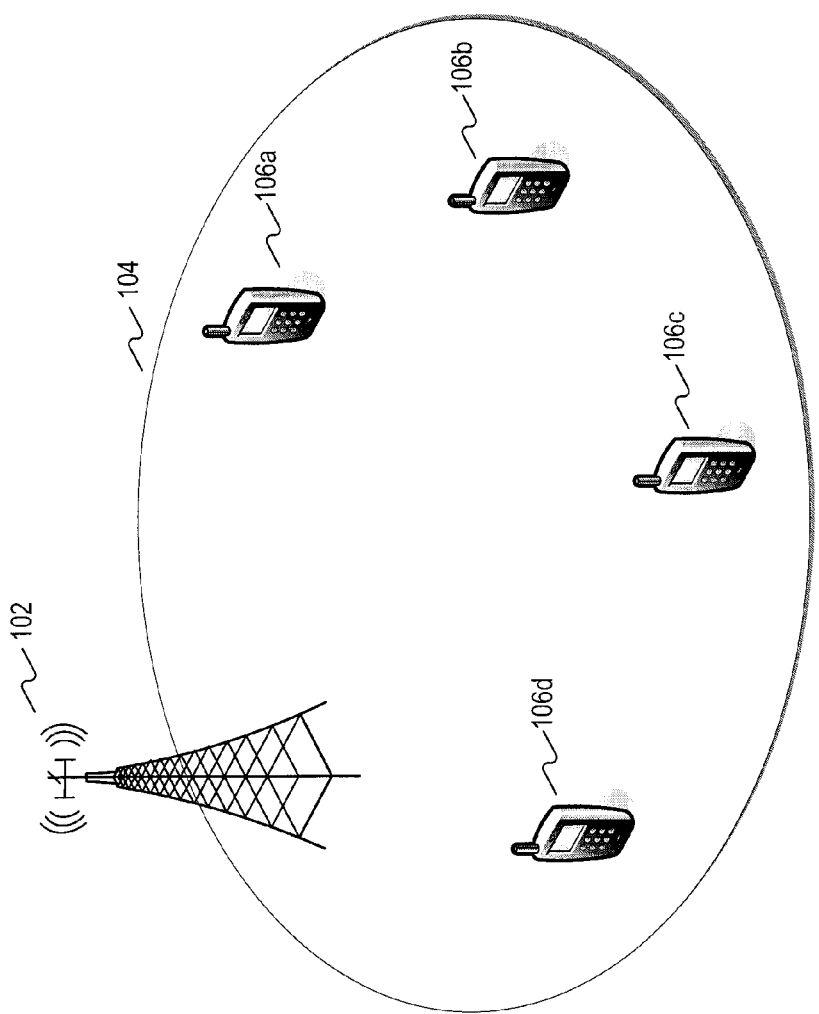
FIG. 1 illustrates a diagram of an exemplary mobile network consistent with some embodiments of the present invention.

FIG. 1 is a diagram illustrating components of an exemplary system 100 for implementing embodiments consistent with the present invention. By way of example, system 100 may be implemented to provide mobile communication services, such as Multimedia Broadcast/Multicast Service (MBMS) to target group 104 of mobile stations (MS) 106a-d. As further disclosed herein, base station (BS) 102 may send a counting request message that may include a code set with a plurality of codes. Each MS 106a-d, independent of its connection status, may individually select one or more code(s) and respond to the counting request message of BS 102 with the selected code(s). Based on the number of codes detected by BS 102, BS 102 may determine the number of mobile station in target group 104.

As shown in the example of FIG. 1, system 100 may include a wireless communications network using various communication technologies. Those communication technologies may include, but are not limited to, one or more of code division multiple access (CDMA), wideband code division multiple access (WCDMA), wireless local area network (WLAN), worldwide interoperability for microwave access (WiMAX), and orthogonal frequency-division multiplexing (OFDM). By using one or more of these communication technologies, BS 102 and each of MS 106a-d may be coupled (such as communicatively coupled by wireless communication signals) to transmit and receive voice and data information. In the exemplary embodiment of FIG. 1, BS 102 and MS 106a-d may be coupled to other systems (not shown) or target groups (not shown) via a wired or wireless communication network (not shown), or may directly access other systems, users groups, data storages, or other network applications.

As shown in FIG. 1, BS 102 may be coupled to target group 104 that may include one or more of MS 106a-b. Although a specific numbers of base stations and mobile stations are shown in FIG. 1, FIG. 1 is exemplary and any numbers of base stations and mobile devices may be provided. Furthermore, the functions provided by one or more devices of system 100 may be combined, substituted, or re-allocated among various devices. BS 102 may include any appropriate apparatus or system that facilitates communication between a mobile station and a network. For example, in some embodiments, BS 102 may include a wireless communication device installed at a fixed location to create a cell or defined geographic region of network coverage, such as a Node-B, a base transceiver system (BTS), an access point, a home base station, etc. In other embodiments, BS 102 may be a relay station, an intermediate node, or an intermediary. BS 102 may include any appropriate type of wireless or radio base station, such as a land-based communication base station or a satellite-based communication base station. BS 102 may include any appropriate type voice, data, and/or integrated voice and data communication equipment to provide high speed data and/or voice communications. In other embodiments, any other type of base station or equivalent thereof may be used.

Target group 104 may be a group of mobile stations located in a specific geographic region associated with one or more base stations. In some embodiments, target group 104 may comprise mobile stations that subscribe to a specific multicast service and have joined a multicast group associated with that service. In other embodiments, target group 104 may comprise mobile stations that have not provided a subscription indication to the network operator or network service provider.

MS 106*a-d* may be any type of device for communicating with any one of BS 102. For example, MS 106*a-d* may be a mobile communication device, or any other appropriate computing platform or device capable of exchanging data and/or voice information with BS 102 such as servers, clients, desktop computers, laptop computers, network computers, workstations, personal digital assistants (PDA), tablet PCs, scanners, telephony devices, pagers, cameras, musical devices, etc. In addition, MS 106*a-d* may be a fixed computing device operating in a mobile environment, such as, for example, a bus, a train, an airplane, a boat, a car, etc. In some embodiments, MS 106*a-d* may be coupled to communicate with BS 102 using any of the various communication standards supporting mobile communication devices. MS 106*a-d* may be configured to communicate with other mobile stations (not shown) directly or indirectly via BS 102 or other base stations or computing systems (not shown) using wired or wireless communication methods.

Figure 2:
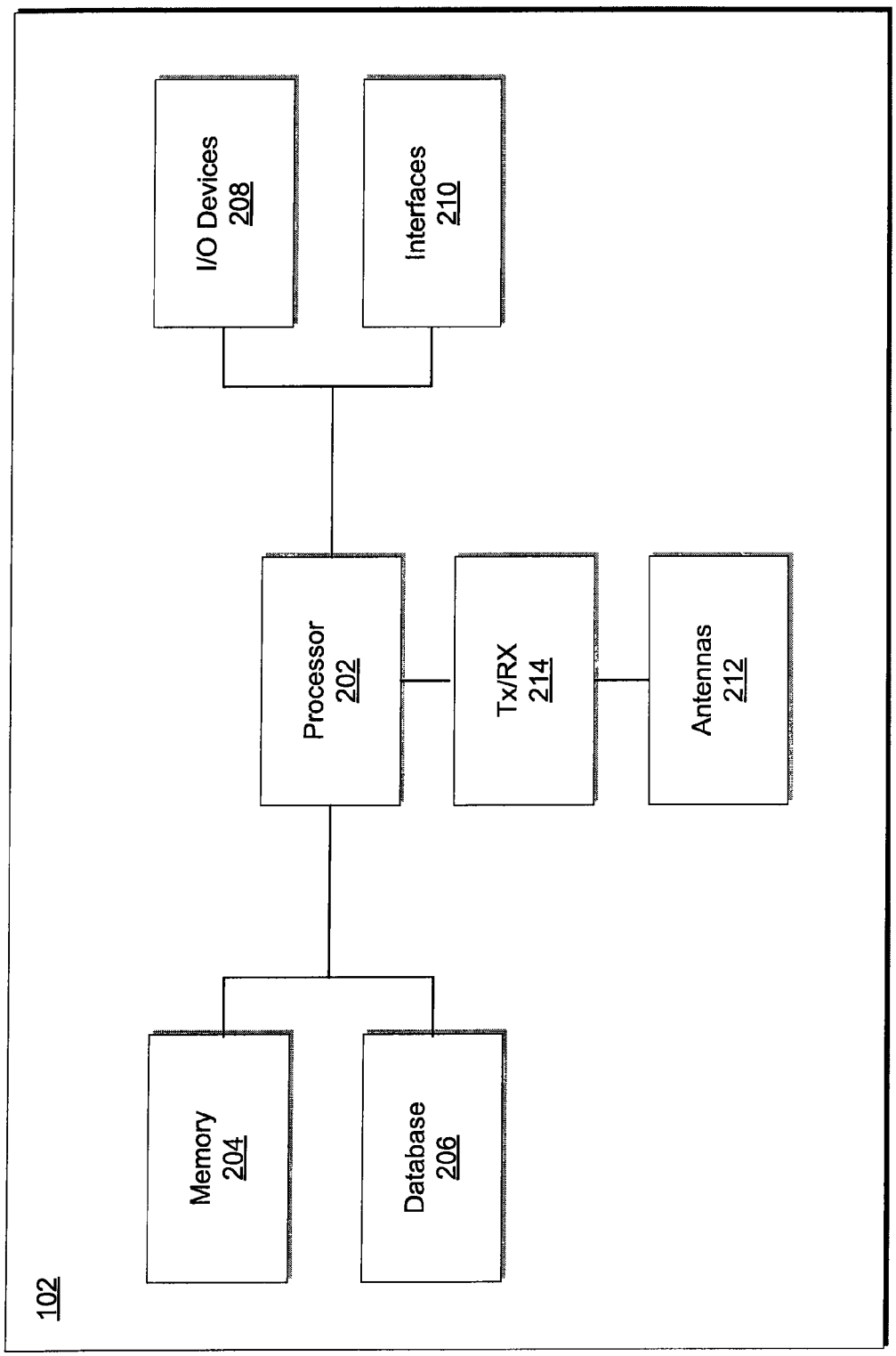
FIG. 2 illustrates a block diagram of an exemplary base station consistent with some embodiments of the present invention.

FIG. 2 illustrates a block diagram of an exemplary BS 102 consistent with some embodiments of the present invention. As shown in FIG. 2, BS 102 may include one or more of the following components: at least one processor 202 configured to execute computer program instructions to perform various processes and methods, memory 204 configured to access and store information and computer program instructions, database 206 to store tables, lists, or other data structures, I/O devices 208, interfaces 210, antennas 212, and transceiver 214.

Processor 202 may be a general purpose processor, application specific integrated circuit (ASIC), embedded processor, field programmable gate array (FPGA), microcontroller, or other like device. Processor 202 may act upon instructions and data to process data output from transceiver 214, I/O devices 208, interfaces 210, or other components that are coupled to processor 202. In some embodiments, processor 202 may be coupled to exchange data or commands with memory 204. For example, processor 202 may contain code operable to evaluate the number of mobile stations in target group 104 by applying a maximum likelihood estimation to codes received from mobile stations in response to a counting message sent from BS 102. In other embodiments, processor 202 can exchange data, including control information and instructions with other devices or functional modules coupled to BS 102.

Memory 204 may be one or more memory devices that store data as well as software and may also comprise, for example, one or more of volatile or non volatile semiconductor memories, magnetic storage, or optical storage. Memory 204 may be a computer-readable storage medium. Memory 204 may be distributed. That is, portions of memory 204 may be removable or non-removable. In some embodiments, memory 204 may be implemented in a network (not shown) coupled to communicate with BS 102.

Database 206 may be a structured collection of tables, lists, or other data structures. Database 206 may be a database management system (DBMS), a relational database management system, an object-oriented database management system, or similar database system. As such, the structure may be organized as a relational database or an object-oriented database. In other embodiments, database 206 may be a hardware system comprising physical computer-readable storage media and input and/or output devices configured to receive and provide access to tables, lists, or other data structures. Further, hardware system database 206 may include one or more processors and/or displays.

I/O devices 208 may be one or more of a mouse, stylus, keyboard, audio input/output device, imaging device, printing device, display device, sensor, wireless transceiver, or other similar device. I/O devices 208 may also include devices that provide data and instructions to memory 204 and/or processor 202.

Interfaces 210 may include external interface ports, such as USB, Ethernet, FireWire®, and wireless communication protocols. Interfaces 210 may also include a graphical user interface, or other humanly perceivable interfaces configured to present data, including but not limited to, a portable media device, traditional mobile phone, smart phone, navigation device, or other computing device. BS 102 may be operatively connected to a network (not shown) via a wired and/or wireless communications link using interface 210.

Transceiver 214 may include any appropriate type of transmitter and receiver to transmit and receive voice and/or data from BS 102 to MS 106*a-d* and other devices assigned to target group 104. In some embodiment, transceiver 214 may include one or a combination of desired functional component(s) and processor(s) to encode/decode, modulate/demodulate, and to perform other wireless communication channel related functions. Transceiver 214 may be coupled to communicate with antenna 212 to transmit and receive voice and/or data in one of various transmission modes. Transmission modes may include, for example, point-to-point (PTP), single-cell point-to-multipoint (SC-PTM), and multi-cell point-to-multipoint (MC-PTM) as previously described. Antenna 212 may be a single antenna or an antenna array.

Figure 3:
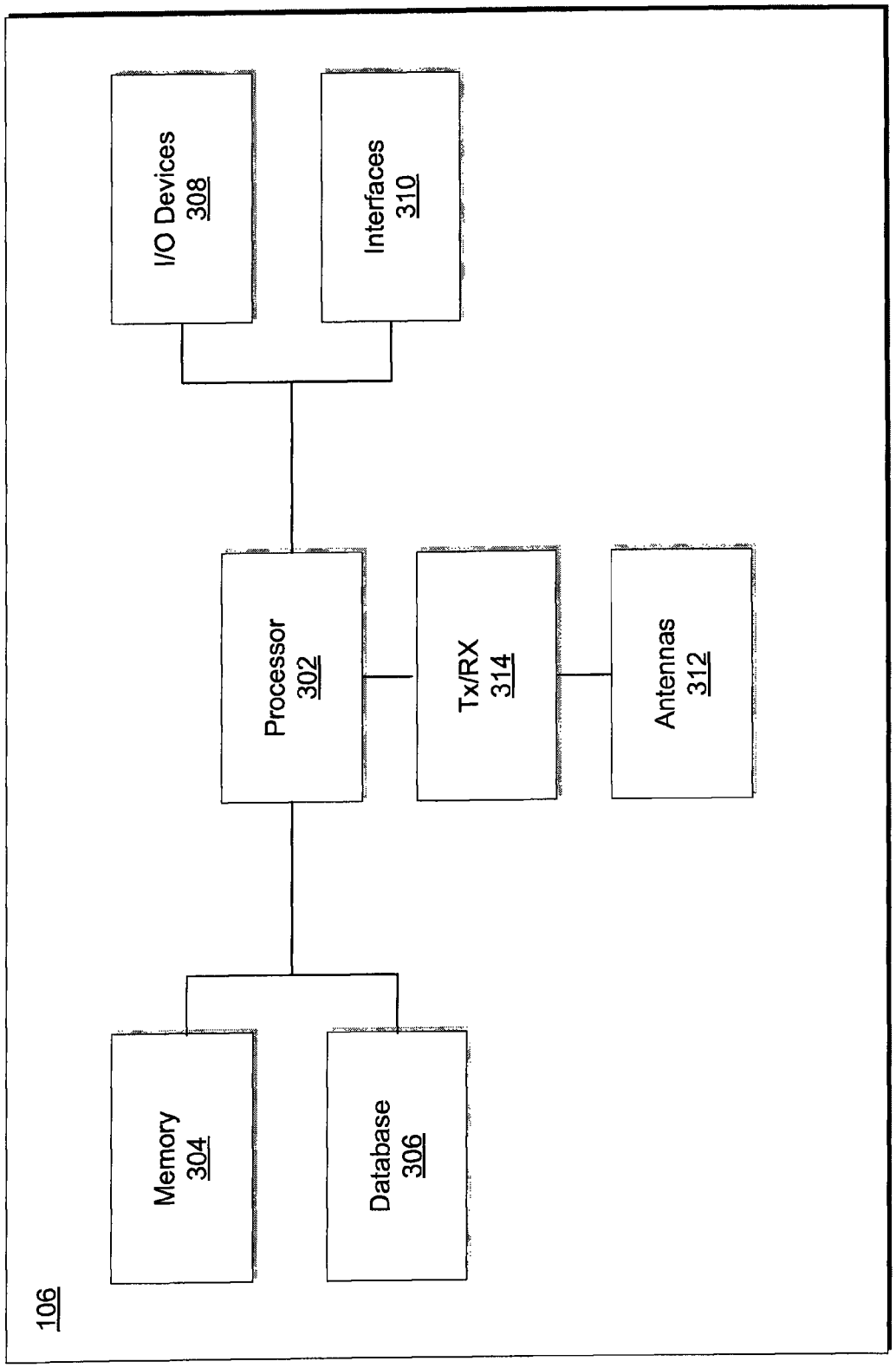
FIG. 3 illustrates a block diagram of an exemplary mobile station consistent with some embodiments of the present invention.

FIG. 3 illustrates a block diagram of an exemplary mobile station 106 consistent with some embodiments of the present invention. As shown in FIG. 3, MS 106 may include one or more of the following components: at least one processor 302 configured to execute computer program instructions to perform various processes and methods, memory 304 configured to access and store information and computer program instructions, database 306 to store tables, lists, or other data structures, I/O devices 308, interfaces 310, antennas 312, and transceiver 314.

Processor 302 may be a general purpose processor, application specific integrated circuit (ASIC), embedded processor, field programmable gate array (FPGA), microcontroller, or other like device. Processor 302 may act upon instructions and data to process data output from transceiver 314, I/O devices 308, interfaces 310, or other components that are coupled to processor 302. In some embodiments, processor 302 may be coupled to exchange data or commands with memory 304. For example, processor 302 may contain code operable to execute instructions that provides one or more graphical user interfaces (GUIs) for interacting with network resources and/or accessing data provided by BS 102. In other embodiments, processor 302 can exchange data, including control information and instructions with other mobile stations, devices, or functional modules coupled to BS 102.

Memory 304 may be one or more memory devices that store data as well as software and may also comprise, for example, one or more of volatile or non volatile semiconductor memories, magnetic storage, or optical storage. In some embodiments, memory 304 may be a portable computer-readable storage media, such as a portable memory cards, including, for example Compact Flash cards (CF cards), Secure Digital cards (SD cards), Multi-Media cards (MMC cards), or Memory Stick cards (MS cards). Portable memory devices may be equipped with a connector plug such as, a Universal Serial Bus (USB) connector or a FireWire® connector for uploading or downloading data and/or media between memory 304 and other devices (not shown).

Database 310 may be a structured collection of tables, lists, or other data structures. The structure may be organized as a relational database or an object-oriented database. In some embodiments, software, such as a database management system, may be utilized to manage and to provide access to the data structures. In other embodiments, database 306 may be a hardware system comprising physical computer-readable storage media and input and/or output devices configured to receive and provide access to tables, lists, or other data structures. Further, hardware system database 306 may include one or more processor and/or displays.

I/O devices 312 may be one or more of a mouse, stylus, audio input/output device, imaging device, printing device, or other similar device. Interfaces 310 may include external interface ports, such as USB, Ethernet, FireWire®, and wireless communication protocols. Interfaces 310 may also include a graphical user interface. MS 106 may be operatively connected to a network (not shown) via a wired and/or wireless communications link using interface 310.

Transceiver 314 may include any appropriate type of transmitter and receiver to transmit and receive voice and/or data from BS 102 to MS 106a-d and other devices assigned to target group 104. In some embodiment, transceiver 314 may include one or a combination of desired functional component(s) and processor(s) to encode/decode, modulate/demodulate, and to perform other wireless communication channel related functions. Transceiver 314 may be coupled to communicate with antenna 312 to transmit and receive voice and/or data in one of various transmission modes. Transmission modes may include, for example, point-to-point (PTP), single-cell point-to-multipoint (SC-PTM), and multi-cell point-to-multipoint (MC-PTM) previously described. Antenna 312 may be a single antenna or an antenna array.

Figure 4:
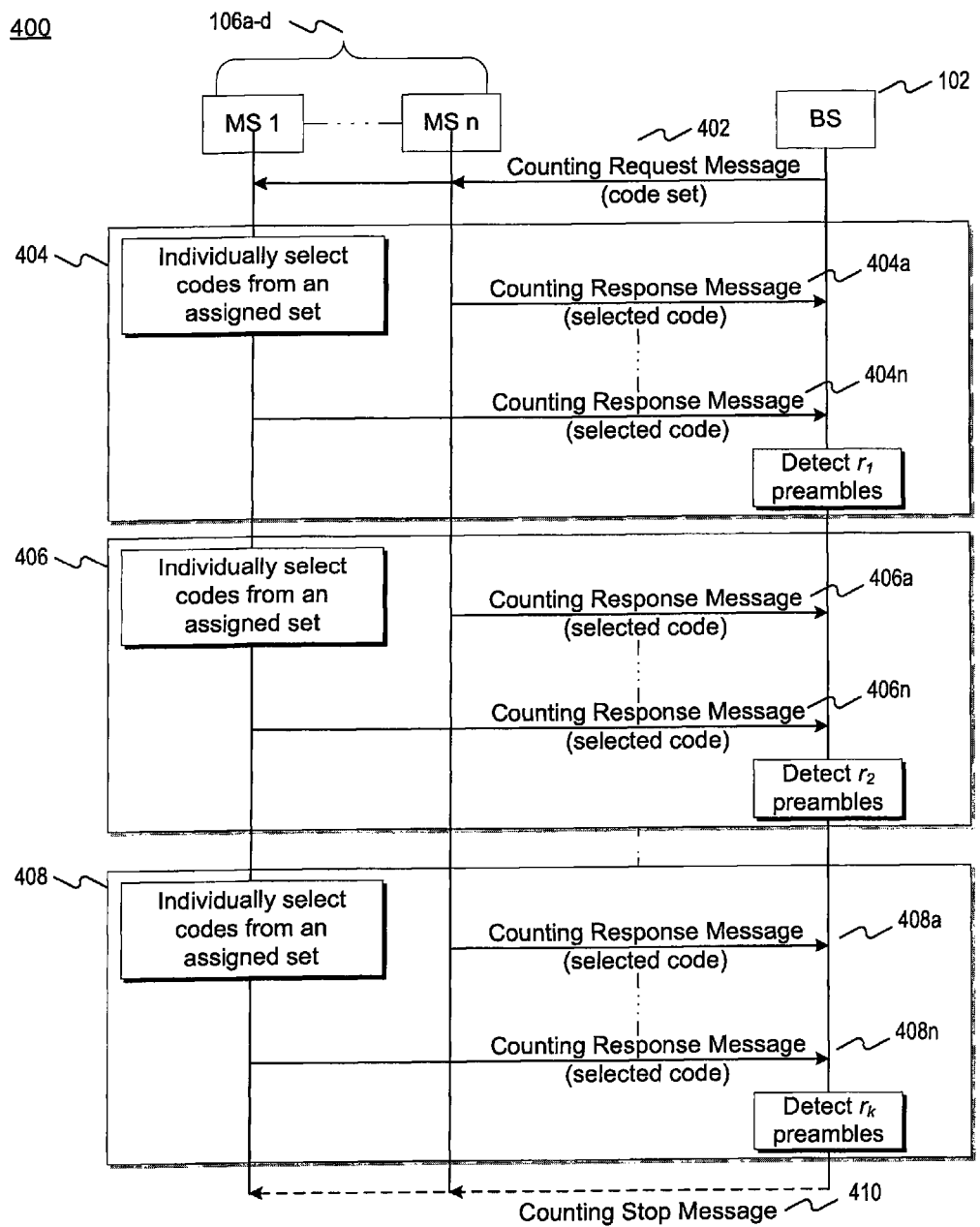
FIG. 4 illustrates a flow chart of an exemplary method for evaluating the number of mobile stations in a target group consistent with some embodiments of the present invention.

FIG. 4 illustrates a flow chart 400 of an exemplary method for evaluating the number of mobile stations in a target group consistent with some embodiments of the present invention. As shown in FIG. 4, in some embodiments, the evaluation method may be initiated by sending counting request message 402. For example, in some embodiments BS 102 may send counting request message 402 over a communication channel to determine the number of mobile stations associated with a target group independent of their respective connection states. Here, counting request message 402 may be transmitted using various methods. Transmission methods, for example, may include but are not limited to, group multicast channel, such as multicast control channel (MCCH) in a Third Generation Partnership Project (3GPP) system or multicast broadcast service MAP (MBS MAP) in a Worldwide Interoperability for Microwave Access (WiMAX) system. The 3GPP system may include the Universal Mobile Telecommunication System (UMTS), the High-Speed Uplink Packet Access (HSUPA), the Evolved High-Speed Packet Access (HSPA Evolution), the Long Term Evolution (LTE), the LTE Advanced system, etc. In other embodiments, the transmission methods may further include, broadcast channel using a group identifier, such as group ID, connection identifier (CID), multicast CID (MCID), logical channel ID (LCID), group radio network temporary identifier (RNTI), service RNTI, or similar identifiers. Using either transmission method may limit reception to MS devices within a particular target group. Yet, the connection status, that is whether a targeted MS is idle or active, does not prevent reception of counting request message 402 by a MS.

In some embodiments, counting request message 402 may be formatted to include one or more uplink resource. For example, the uplink resource may be a code set, which may include a set of orthogonal ranging codes. In other embodiments the code set may include random access channel (RACH) signatures, RACH preambles, RACH orthogonal codes, RACH Code Division Multiple Access (CDMA) codes, ranging codes, ranging CDMA codes, or similar codes reserved for performing the evaluation process as described herein. Formatting may be performed using one or a combination of components associated with BS 102. For example, processor 202 may execute instructions stored in memory 204 that may access data stored in database 206 associated with a particular formatting scheme. Alternatively or in addition, processor 202 may utilize I/O devices 208 and/or interfaces 210 to access instructions or code stored on a secondary storage device or computing device (not shown) to access or to create a code set. In some cases, a code set may be stored in memory associated with BS 102, including but not limited to memory 204 and/or secondary storage (not shown) accessible via I/O devices 208 or interfaces 210.

In response to transmitting the counting request message 402, individual uplink resources may be selected, transmitted, and detected over the course of multiple trials. For example, as shown in FIG. 4, the uplink resources included in the counting request message 402 may be a code set. During a first trial 404 each MS 106a-d may select a code from the code set. A selected code may include content that corresponds to a portion of the transmitted code set. For example, in some cases, a selected code may be received by processor 302 executing instructions to maintain, remove, add, or otherwise modify content associated with the selected code. In some embodiments, the code set may be carried in counting request message 402 as previously described. In other embodiments, the code set may be a predefined ranging code set, as specified in a wireless communication standard, such as a ranging code pool, ranging code book, or similar code set. Once a code is selected, counting response messages 404a through 404n may be generated and transmitted over one or more uplink resources. In some embodiments, the uplink resource may be pre-defined or pre-allocated. For example, MS 106a-d may transmit the selected code, over a RACH slots, ranging channels, or a similar communication channel providing an uplink from a mobile station to a base station. In some embodiments, the communication channel may be the same, similar, or different from the channel transmitting the initial counting request message. In other embodiments, an alternative uplink channel may be provided using information included in counting request message 402. Further, counting response messages 404a through 404n may be transmitted using the same, similar, or different transmission power.

In other exemplary embodiments, the uplink resources included in the counting request message 402 may be a set of uplink channels (e.g., uplink opportunities or slots). During a first trial 404, each MS 106a-d may select an uplink channel from the assigned set. Once an uplink channel is selected, counting response messages 404a through 404n may be generated and transmitted over the selected uplink channels. Similarly, counting response messages 404a through 404n may be transmitted using the same, similar, or different transmission power. For example, MS 106a-d may send the counting response messages 404a through 404n by using the same transmission power. As a result, based on the received signal quality of the counting response messages 404a through 404n, the BS 102 may be able to evaluate the channel condition.

Based on the number of detected codes received over the allocated uplink resource and/or the number of uplink channels detecting the counting response signals, the number of mobile stations within a target group may be evaluated. Alternatively or additionally, additional evaluation trials may be performed as indicated by second trial 406 through final trial 408. Each subsequent trial operates in a similar functional manner as first trial 404. To terminate the evaluation, in some embodiments, counting stop message 410 may be transmitted to stop the counting process at any suitable time. Counting stop message 410, like counting request message 402, may be transmitted over a group multicast channel and/or a broadcast channel with a target group identifier. The target group identifier may include, but is not limited to, group ID, connection identifier (CID), multicast CID (MCID), logical channel ID (LCID), group radio network temporary identifier (RNTI), service RNTI, or similar identifiers.

Figure 5:
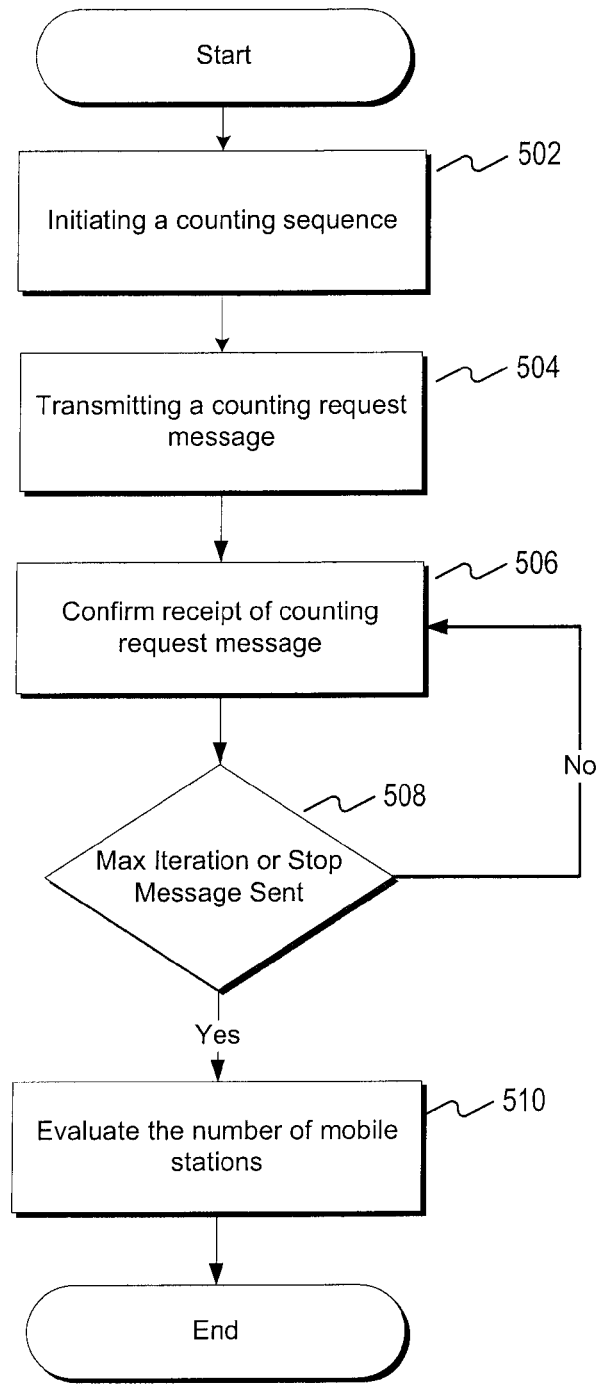
FIG. 5 illustrates an exemplary method for evaluating the number of mobile stations in a target group consistent with some embodiments of the present invention.

FIG. 5 illustrates an exemplary method 500 for evaluating the number of mobile stations in a target group consistent with some embodiments of the present invention. As shown in FIG. 5, in step 502, a counting sequence may be initiated to evaluate the number of mobile stations in a target area. For example, counting sequence may be initiated based on an instruction received by processor 202. In some embodiments, processor 202 may initialize one or more registers in memory 204 to store a current trial iteration value, past iteration value, and/or a threshold value corresponding to a maximum number of evaluation trials that may be performed for a given counting cycle.

In response to initiating the counting sequence of step 502, a counting request message may be transmitted to target group members, wherein target group members include mobile stations associated with a target group. Step 504, for example, may be performed by BS 102, where BS 102 may send counting request message 402 over a communication channel using various transmission methods. Transmission methods, for example, may include but are not limited to, group multicast channel, such as multicast control channel (MCCH) in a Third Generation Partnership Project (3GPP) system. In other embodiments, the transmission methods may further include, broadcast channel using a group identifier, such as group ID, connection identifier (CID), multicast CID (MCID), logical channel ID (LCID), group radio network temporary identifier (RNTI), service RNTI, or similar identifiers.

In some embodiments, counting request message 402 may be formatted to include a code set or its equivalent. A code set may be formatted by processor 202, for example, to include a set of orthogonal ranging codes to facilitate reception of multiple ranging codes at the base station at the same time using the same uplink resource. In other embodiments, the code set may include random access channel (RACH) signatures, RACH preambles, RACH orthogonal codes, RACH Code Division Multiple Access (CDMA) codes, ranging codes, ranging CDMA codes, or similar codes reserved for performing the evaluation process as described herein.

In other embodiments, counting request message 402 may be formatted to include allocated uplink resource information for target users to report their selected ranging codes, as will be discussed in FIG. 6. Allocated uplink resource information, for example, may include random access channel (RACH) slots, ranging channels, or similar communication channels for exchanging information from a mobile station to a base station.

Counting request message 402 may further be formatted to include a threshold value associated with the maximum number evaluation trials and a probability factor used to reduce the likelihood that two or more target users will select the same orthogonal ranging code as will be discussed in FIG. 6. In some embodiment, counting request message 402 may be sent over a group multicast channel and/or a broadcast channel including a target group identifier. The target group identifier may include, but is not limited to, a group ID, a connection identifier (CID), a multicast CID (MCID), a logical channel ID (LCID), a group radio network temporary identifier (RNTI), a service RNTI, or similar identifiers.

In step 506, selected codes may be received in response to transmitting counting request message 402. As described herein, "received" may include reception of data using a communication channel and/or detection of the data using one or a combination of components, such as transceiver 214, processor 202, and memory 204. Here, the communication channel may be the same, similar, or different from a communication channel transmitting the initial counting request message. Further, when performing multiple counting trials, the communication channel receiving a counting request message during one trial may be the same, similar, or different from a communication channel receiving the counting request message during a different trial.

In some embodiments, one or more counting trials may be used to evaluate the number of mobile stations in a target group. In those embodiments, step 508 may be performed to determine when the counting cycle should be terminated. In operation, in step 508, the current iteration value is compared to a threshold iteration value to determine if the counting cycle has completed a predetermined number of trials. Here, the current iteration value and the threshold value may be stored in memory associated with BS 102, including local memory 204 or remote memory coupled to communication with BS 102 using I/O devices 208 or interfaces 210. In cases were the current iteration value is greater than or equal to the threshold value, the counting cycle is terminated. Alternatively or additionally, the counting cycle may also be terminated by sending counting stop message 410. Counting stop message 410, like counting request message 402, may include a target group identifier. In some embodiments, codes may continued to be received after sending counting stop message 410 to detect selected codes from mobile stations that may not have received counting stop message 410 due to transmission, reception, or processing errors. Here, counting stop message 410 may continue to be sent until no assigned ranging codes are detected in subsequent trials.

In step 510, the number of mobile stations in a target group may be evaluated. In some embodiments, an evaluation may be performed based on the number of detected codes received during one or more trials. For example, BS 102 may perform this step by determining that the target group contains r members where r is the maximum number of detected ranging codes, as expressed by $$r = \max(r_1, r_2, \ldots, r_k), \quad (1)$$

where $r_1, r_2, \ldots, r_k$ are the number of received codes from k trials.

In other embodiments, the determination may be made by applying a maximum likelihood estimation to the detected codes from one or more counting trials. In operation, for example, BS 102 may assign s orthogonal ranging codes for a counting process as previously described. In response to sending counting request message 402 carrying s orthogonal ranging codes or their equivalents, BS 102 may receive $r_1, r_2, \ldots, r_k$ over the course of k trials, respectively. If N denotes the actual number of members in the target group, and random variable $R_i$ is a random variable that represents the number of detected ranging codes in the i-th trial, then the target group may be estimated to have n members, where the parameter n maximizes $$Pr[N=n|R_1=r_1, R_2=r_2, \ldots, R_k=r_k], \quad (2)$$

which is equivalent to maximizing $$Pr[R_1=r_1, R_2=r_2, \ldots, R_k=r_k|N=n] \cdot Pr[N=n]. \quad (3)$$

In other words, in the case where prior information about the number of target group members is unknown, or each possible group member number in the target group is of equal likelihood (i.e. Pr[N=n] is the same for each possible n), evaluating the number of target group members may be equivalent to finding the target group member number n such that $$Pr[R_1=r_1, R_2=r_2, \ldots, R_k=r_k|N=n] \qquad (4)$$

is maximal. Since the detected ranging code numbers in these k trials are mutually independent, the equation (4) may be equivalent to:

$$\prod_{j=1}^{k} C_{r_j}^s \cdot \sum_{i=0}^{r_j} (-1)^i C_i^{r_j} \left(\frac{r_j - i}{s}\right)^n \text{ if } \varepsilon = 0 \qquad (5)$$

$$\prod_{j=1}^{k} \left[ \sum_{m=0}^{n} C_m^n (1-\varepsilon)^m \varepsilon^{n-m} \cdot C_{r_j}^s \cdot \sum_{i=0}^{r_j} (-1)^i C_i^{r_j} \left(\frac{r_j - i}{s}\right)^m \right]$$

if $0 < \varepsilon < 1$, where $C_q^p$ represents the binomial coefficient $$\frac{p!}{q!(p-q)!},$$

and $\varepsilon$ represents an error probability of transmitting a ranging code. For example, $\varepsilon$ may be due to transmission power, transmission/reception error, or other like phenomenon.

In other embodiments, step 510 may include measures to increase estimation accuracy by reducing the collision probability. For example, collision probability may be associated with the likelihood that two or more target group member select and respond to the same code. In operation, a probability factor may be assigned, for example, by BS 102 using counting message 402. Probability factor may in turn be used by a mobile station associated with a specific target group user to determine whether or not to respond by sending a selected ranging code as described in greater detail in FIG. 6. Accordingly, since a portion of target group members may send codes in response to applying the probability factor during each trial, an evaluation of target group members from all trials may be made by modifying equation (4) according to the following expression:

$$\prod_{j=1}^{k} \left[ \begin{array}{l} \sum_{y=0}^{n} C_y^n p^y (1-p)^{n-y} \cdot C_{r_j}^s \cdot \\ \sum_{i=0}^{r_j} (-1)^i C_i^{r_j} \left(\frac{r_j - i}{s}\right)^y \end{array} \right] \text{ if } \varepsilon = 0 \qquad (6)$$

$$\prod_{j=1}^{k} \left[ \sum_{y=0}^{n} C_y^n p^y (1-p)^{n-y} \sum_{m=0}^{y} C_m^y (1-\varepsilon)^m \right.$$

$$\left. \varepsilon^{y-m} \cdot C_{r_j}^s \cdot \sum_{i=0}^{r_j} (-1)^i C_i^{r_j} \left(\frac{r_j - i}{s}\right)^m \right] \text{ if } 0 < \varepsilon < 1,$$

where p represents the assigned probability factor. By setting p=1, equation (6) will be equivalent to equation (5).

Figure 6:
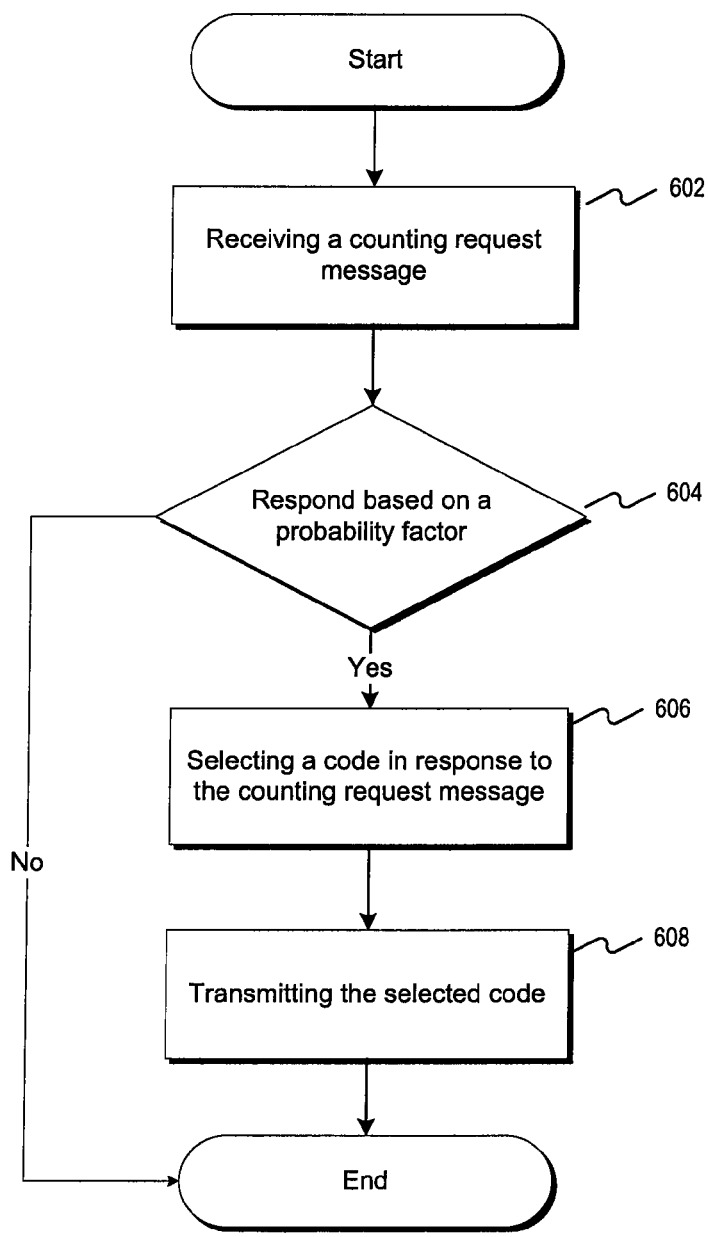
FIG. 6 illustrates and exemplary method for responding to a counting request message consistent with some embodiments of the present invention.

FIG. 6 illustrates and exemplary method 600 for responding to a counting request message consistent with some embodiments of the present invention. In step 602, selected codes may be received in response to transmitting counting request message 402. As described herein, "received" may include reception of data using a communication channel and/or detection of the data using one or a combination of components, such as transceiver 314, processor 302, and memory 304 associated with mobile station 106.

In some embodiments, optional step 604 may be performed in cases where the determination of whether to response to a code provided in counting message 402 is also based on an assigned probability factor. For example, in some embodiments, an assigned probability factor may be received via counting request message 402. In operation, a mobile station may select a random number between 0 and 1. The selected number may then be compared to the received probability factor to determine whether or not to transmit a selected code. In some embodiments, for example, if the selected random number is smaller than the assigned probability factor, then the mobile station may transmit the selected code. Otherwise, the mobile station may mute the trial.

In step 606, once a code set has been received and/or determined suitable for transmission resulting from step 604, a code associated with the code set may be selected. Codes may be selected by both idle and active mobile stations. Code selection may be performed, for example, using one or a combination of processor 302, memory 304, and database 306.

In step 608, counting response message may be transmitted over an uplink resource. For example, as previously described, MS 106a-d may transmit counting response messages 404a through 404n, respectively, over a RACH slots, ranging channels, or a similar communication channel providing an uplink from a mobile station to a base station. In other embodiments, an alternative uplink channel may be provided using information included in counting request message 402. Further, counting response messages 404a through 404n may be transmitted using the same, similar, or different transmission power. In some embodiments, step 608 may be terminated upon receiving counting stop message 410.

Alternatively or additionally, additional evaluation trials may be performed as indicated by second trial 406 through final trial 408. In some embodiments, MS 106a-d may operate in a similar functional manner during each subsequent trial as illustrated in FIG. 6. In other embodiments, MS 106a-d may perform the step 604 to determine whether to respond a code based on the determination of previous trials. For example, MS 106a-d may determine not to respond a code in this trial because the MS has responded one or more codes before.

It will be appreciated by those skilled in the art that changes could be made to the disclosed embodiments described above without departing from the broad inventive concept thereof. It is understood, therefore, that the disclosed embodiments are not limited to the particular examples disclosed, but is intended to cover modifications within the spirit and scope of the disclosed embodiments as defined by the claims that follow.

What is claimed is:

1. A method of estimating a number of mobile stations in a target group using a processor that executes instructions to perform the method, the method comprising:
   initiating a counting event using the processor;
   transmitting over a first communication channel in response to the counting event, a counting request message;
   confirming receipt of a first counting response message over a second communication channel in response to the counting request message transmitted; and
   determining the number of mobile stations in the target group independent of a connection status of each mobile station by performing at least a maximum likelihood estimation calculation based in part on the confirmed receipt of the first counting response message.

2. The method of claim 1, wherein the counting request message comprises a code set.

3. The method of claim 2, further comprising formatting the code set to include a plurality of orthogonal codes.

4. The method of claim 1, wherein the first counting response message comprises a first code.

5. The method of claim 4, wherein the first code comprises content corresponding to a portion of a code set.

6. The method of claim 1, wherein confirming the receipt of the first counting response message further comprises:
   confirming receipt of the first counting response message over a first communication channel associated with a first group of mobile stations in the target group; and
   confirming non-receipt of the first counting response message over a second communication channel associated with a second group of mobile stations in the target group.

7. The method of claim 1, the method further comprising: performing a plurality of evaluation trials.

8. The method of claim 1, further comprising:
   formatting the counting request message to include at least one of allocated uplink information.

9. The method of claim 1, further comprising:
   formatting the counting request message to include at least one of a threshold value associated with a plurality of evaluation trials and a probability factor.

10. The method of claim 1, further comprising:
    formatting the counting request message to include at least one of a target group identifier, a connection identifier, a logical channel identifier, and a group radio network temporary identifier.

11. The method of claim 1, further comprising:
    receiving over a third communication channel a second counting response message, wherein the second counting response message comprises a second code;
    comparing a current iteration value to a threshold value in response to receiving the second counting response message;
    incrementing the current iteration value when the current iteration value is less than the threshold value; and
    determining, based in part on the first and the second counting response message, the number of mobile stations in the target group when the current iteration value is greater than or equal to the threshold value or when a counting stop message is sent.

12. The method of claim 11, further comprising:
    formatting the counting stop message to include at least one of a target group identifier, a connection identifier, a logical channel identifier, and a group radio network temporary identifier.

13. A method of estimating a number of mobile stations in a target group using a processor that executes instructions to perform the method, the method comprising:
    assigning, using the processor, a plurality of codes to the target group;
    confirming receipt of a first code over a first communication channel in response to the plurality of codes during a first trial;
    comparing a current iteration value to a threshold value in response to the confirmation;
    incrementing the current iteration value to perform a second trial when the current iteration value is less than the threshold value;
    confirming receipt of a second code over a second communication channel in response to the plurality of codes during the second trial; and
    determining, using the processor that performs a station number estimation based in part on confirming receipt of the first and the second code, the number of mobile stations in the target group when the current iteration value is greater than or equal to the threshold value or a counting stop message is sent.

14. The method of claim 13, wherein determining the number of mobile stations in the target group is based on a maximum number of codes received during each trial.

15. The method of claim 13, wherein determining the number of mobile stations in the target group is based on a maximum likelihood estimation.

16. The method of claim 13, wherein determining the number of mobile stations in the target group further comprises:
    determining a parameter n, which maximizes
    $Pr[R_1=r_1, R_2=r_2, \ldots, R_k=r_k|N=n] \cdot Pr[N=n]$, wherein $R_i$ is a random Variable that represents a number of detected ranging codes in an i-th trial, $r_1, r_2, \ldots, r_k$ are a number of received codes from k trials, respectively, and N represents an actual number of members in the target group.

17. The method of claim 13, wherein determining the number of mobile stations in the target group further comprises:
    determining a parameter n, which maximizes
    $Pr[R_1=r_1, R_2=r_2, \ldots, R_k=r_k|N=n]$, wherein $R_i$ is a random variable that represents a number of detected ranging codes in an i-th trial, $r_1, r_2, \ldots, r_k$ are a number of received codes from k trials, respectively, and N represents an actual number of members in the target group.

18. The method of claim 13, wherein determining the number of mobile stations in the target group further comprises:
    determining a parameter n, which maximizes $$\prod_{j=1}^{k} C_{r_j}^{s} \cdot \sum_{i=0}^{r_j} (-1)^i C_i^{r_j} \left(\frac{r_j - i}{s}\right)^n \text{ if } \varepsilon = 0$$

$$\prod_{j=1}^{k} \left[ \sum_{m=0}^{n} C_m^n (1-\varepsilon)^m \varepsilon^{n-m} \cdot C_{r_j}^{s} \cdot \sum_{i=0}^{r_j} (-1)^i C_i^{r_j} \left(\frac{r_j - i}{s}\right)^m \right]$$

if $0 < \varepsilon < 1$, where $C_q^p$ represents a binomial coefficient, $r_1, r_2, \ldots, r_k$ are a number of received codes from k trials, and $\varepsilon$ represents an error probability of transmitting a ranging code.

19. A method of estimating a number of mobile stations in a target group using a processor that executes instructions to perform the method, the method comprising:
  initiating a counting event using the processor;
  transmitting over a first communication channel in response to the counting event, a counting request message comprising a code set and a probability factor;
  confirming receipt of a first code over a second communication channel in response to a plurality of codes during a first trial based in part on the probability factor;
  comparing a current iteration value to a threshold value in response to the confirmation;
  incrementing the current iteration value to perform a second trial when the current iteration value is less than the threshold value;
  confirming receipt of a second code over a third communication channel in response to the plurality of codes during the second trial based in part on the probability factor; and
  determining, using the processor that performs a station number estimation based in part on confirming receipt of the first and the second code, the number of mobile stations in the target group when the current iteration value is greater than or equal to the threshold value or a counting stop message is sent.

20. The method of claim 19, wherein determining the number of mobile stations in the target group is based on a maximum number of codes received during each trial.

21. The method of claim 19, wherein determining the number of mobile stations in the target group is based on a maximum likelihood estimation.

22. The method of claim 19, wherein determining the number of mobile stations in the target group further comprises:
  determining a parameter n, which maximizes $$\prod_{j=1}^{k} \left[ \frac{\sum_{y=0}^{n} C_y^n p^y (1-p)^{n-y} \cdot C_{r_j}^s \cdot}{\sum_{i=0}^{r_j} (-1)^i C_i^{r_j} \left(\frac{r_j - i}{s}\right)^y} \right] \text{ if } \varepsilon = 0$$

$$\prod_{j=1}^{k} \left[ \sum_{y=0}^{n} C_y^n p^y (1-p)^{n-y} \right.$$

$$\left. \sum_{m=0}^{y} C_m^y (1-\varepsilon)^m \varepsilon^{y-m} \cdot C_{r_j}^s \cdot \sum_{i=0}^{r_j} (-1)^i C_i^{r_j} \left(\frac{r_j - i}{s}\right)^m \right] \text{ if } 0 < \varepsilon < 1,$$

where p is an assigned probability factor, $C_b^a$ represents a binomial coefficient, $r_1, r_2, \ldots, r_k$ are a number of received codes from k trials and $\epsilon$ represents an error probability of transmitting a ranging code.

23. A base station serving a target group, comprising:
  a transmitter configured to send a counting request message over a first communication channel;
  a receiver configured to receive from a second communication channel a first code, associated with the counting request message, in response to transmitting the counting request message; and
  a processor configured to confirm receipt of the first code and evaluate a number of mobile stations in the target group independent of a connection status of each mobile station by performing at least a maximum likelihood estimation calculation based in part on the confirmed receipt of the first code.

24. The base station of claim 23, wherein the counting request message comprises:
  at least one of a target group identifier, a connection identifier, a logical channel identifier, a group radio network temporary identifier, and a probability factor.

25. The base station of claim 23, wherein the counting request message comprises a code set, the code set comprising a plurality of orthogonal codes.

26. A computer-readable storage medium comprising instructions that when executed by a processor, cause a base station to perform the method comprising:
  initiating a counting event using the processor;
  transmitting over a first communication channel in response to the counting event, a counting request message;
  confirming receipt of a first code over a second communication channel in response to the counting request message transmitted; and
  determining a number of mobile stations in a target group independent of a connection status of each mobile station by performing at least a maximum likelihood estimation calculation based in part on the confirmed receipt of the first code.

* * * * *